(No Model.)
J. BERKEY.
METHOD OF MAKING WOODEN BOWLS.
No. 380,742. Patented Apr. 10, 1888.
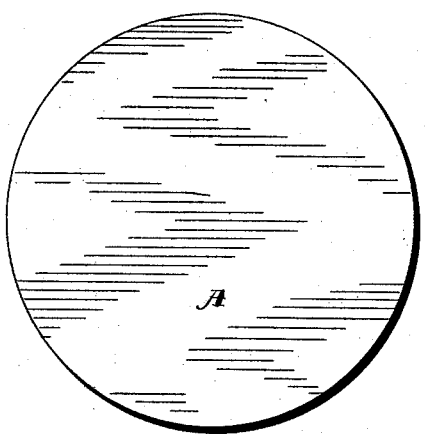
Fig. 1.
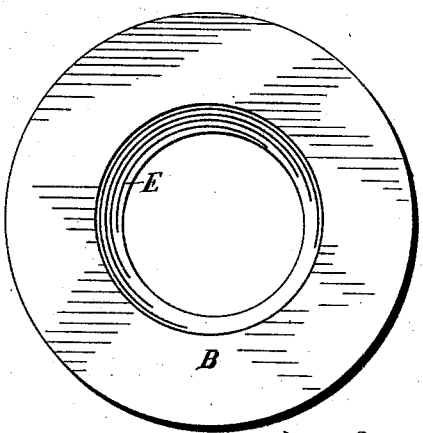
Fig. 2.
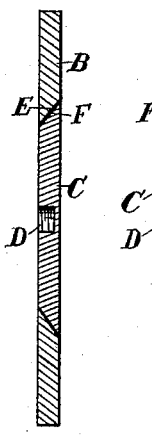
Fig. 3.
Fig. 4.
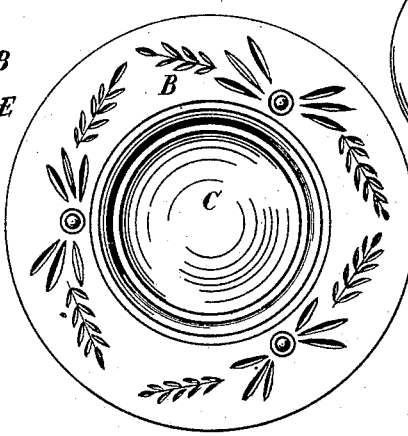
Fig. 5. Fig. 6.
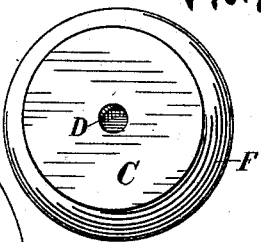
Witnesses.
Arthur C. Denison.
George Clapperton.
Inventor.
Julius Berkey.
By his Attorney
Edward Taggart

UNITED STATES PATENT OFFICE.

JULIUS BERKEY, OF GRAND RAPIDS, MICHIGAN.

METHOD OF MAKING WOODEN BOWLS.

SPECIFICATION forming part of Letters Patent No. 380,742, dated April 10, 1888.

Application filed July 27, 1887. Serial No. 245,470. (No model.)

*To all whom it may concern:*

Be it known that I, JULIUS BERKEY, a citizen of the United States, and a resident of the city of Grand Rapids, county of Kent, and State of Michigan, have invented a new and useful Method of Making a Wooden Bowl or Bowl-Shaped Shelf, of which the following is a specification.

My invention relates to wooden bowls for all ordinary purposes, and particularly to a bowl-shaped shelf or stretcher to be used in connection with and as a part of the furniture-tripod described in my application for a patent thereon, filed January 21, 1887.

The object of my invention is to construct a bowl of any desired depth from thin stock, simplifying the manufacture, and saving the lumber that is wasted when the bowl is turned from stock of the same thickness as the finished bowl. I attain this object by the construction shown in the accompanying drawings, which shows the bowl-shaped shelf used in said tripod, and in which—

Figure 1 shows the stock cut into suitable shape. Fig. 2 shows the central portion cut out, removed, inverted, and placed below. Fig. 3 is a sectional view of the stock after the central portion is cut out, but before it is removed. Fig. 4 is a sectional view of the same, showing this central part removed and attached to the lower surface of the other part. Fig. 5 is a sectional view of the same after the inner concave surface has been turned; and Fig. 6 is a top view of the completed shelf.

A in Fig. 1 is the stock from which the bowl is made. It is a circular piece of ordinary lumber of any desired thickness. I customarily use inch-boards; but thicker or thinner lumber may be used, depending upon the size and depth of the bowl and the number of pieces to be cut out and put together. The stock having been selected, the central portion (shown by C in Fig. 2) is then cut out, leaving the external annular part, B. This cutting is done with a saw so made and set at such an angle to the wood that it will cut a bevel of the same angle all the way around. E shows one of the surfaces left by this cutting, and F the other. A cylindrical socket, D, is cut into the bottom of the part C for the reception of a screw-threaded shaft, as hereinafter described. The part C is then removed and attached, in any suitable manner, firmly to the bottom surface of B, in such a way as to cover the opening left by its removal, and in the form shown in Fig. 4. Probably gluing is the best method of attachment in most cases, but other means may be used. The necessary degree of strength in this attachment depends upon the use to be made of the finished bowl. This leaves an annular portion of the upper surface of C in contact with a similar part of the lower surface of B, the width of the part so in contact depending upon the angle of the bevel and determining the possible thickness of the walls of the bowl. Having assumed this shape, the bowl can now be turned in any desired form, upon both its outer and inner surfaces, in the same way as if the stock were of twice its actual thickness, as shown in Fig. 5, and can be carved and ornamented, as shown in Fig. 6, or otherwise, as thought best.

The socket D is made of proper size to receive the screw-threaded end of a revolving shaft, and thus cause the bowl in process of manufacture to revolve with it. By providing such shafts upon different machines the bowl may be turned upon one, smoothed on another, stained on another, and polished on another, if all these different processes are used, without any further means of attachment to the different machines, except such socket.

I have shown and described a bowl constructed by once cutting the stock, so that there are two strata of wood. It is obvious, however, that by cutting out of the center a larger part than is shown in the drawings, and then in the same manner cutting out the center of the part so removed, and attaching the three parts together, as is described, a bowl can be made one-half deeper than that described; or, if desired, the same process of cutting can be repeated three or more times, increasing each time the depth of the bowl and the number of strata of wood it contains, but not increasing the amount of lumber used.

Having thus described my invention, what I claim to have invented, and desire to secure by Letters Patent, is—

The herein-described method of making wooden bowls and similar articles, which consists in sawing out from a board a circular portion with beveled edges, attaching the upper surface of the part so cut out to the lower surface of the part from which it was cut in such a manner as to cover opening left, and then turning the bowl from the block so formed, substantially as described.

JULIUS BERKEY.

Witnesses:
ARTHUR C. DENISON,
GEORGE CLAPPERTON.